United States Patent
De Lira et al.

(10) Patent No.: US 10,800,260 B2
(45) Date of Patent: Oct. 13, 2020

(54) SYSTEM FOR DETECTING MECHANICAL LOADING OF A TRACTION BATTERY FOR A VEHICLE

(71) Applicant: Dr. Ing. h.c. F. Porsche Aktiengesellschaft, Stuttgart (DE)

(72) Inventors: Adriano Morozini De Lira, Stuttgart-Vaihingen (DE); Ralf Keller, Niefern-Öschelbronn (DE)

(73) Assignee: Dr. Ing. h.c. F. Porsche Aktiengesellschaft (DE)

(*) Notice: Subject to any disclaimer, the term of this patent is extended or adjusted under 35 U.S.C. 154(b) by 68 days.

(21) Appl. No.: 15/704,975

(22) Filed: Sep. 14, 2017

(65) Prior Publication Data

US 2018/0079316 A1 Mar. 22, 2018

(30) Foreign Application Priority Data

Sep. 16, 2016 (DE) .......................... 10 2016 117 441

(51) Int. Cl.
| | |
|---|---|
| *B60L 3/00* | (2019.01) |
| *B60L 58/16* | (2019.01) |
| *B60L 50/60* | (2019.01) |
| *B60L 50/64* | (2019.01) |
| *H01M 10/48* | (2006.01) |
| *H01M 2/10* | (2006.01) |

(52) U.S. Cl.
CPC ............. *B60L 3/0046* (2013.01); *B60L 50/64* (2019.02); *B60L 50/66* (2019.02); *B60L 58/16* (2019.02); *Y02T 10/705* (2013.01); *Y02T 10/7005* (2013.01)

(58) Field of Classification Search
None
See application file for complete search history.

(56) References Cited

U.S. PATENT DOCUMENTS

| 4,914,416 A * | 4/1990 | Kunikane | ............ H01H 13/702 29/610.1 |
| --- | --- | --- | --- |
| 5,706,910 A * | 1/1998 | Kobayashi | ............ B60L 3/0015 180/274 |
| 2004/0035632 A1* | 2/2004 | Kawasaki | ................ B60K 1/04 180/274 |
| 2007/0023215 A1* | 2/2007 | Ueda | ......................... B03B 9/06 180/167 |
| 2008/0118819 A1* | 5/2008 | Gamboa | ............. H01M 10/486 429/61 |

(Continued)

FOREIGN PATENT DOCUMENTS

| DE | 102007063188 A1 | 6/2009 |
| --- | --- | --- |
| DE | 102012207999 A1 | 11/2013 |

(Continued)

OTHER PUBLICATIONS

Machine Translation of WO 2016/143399 (Year: 2016).*

(Continued)

*Primary Examiner* — Navid Ziaeianmehdizaheh
(74) *Attorney, Agent, or Firm* — RatnerPrestia

(57) ABSTRACT

A traction battery includes cell modules for storing electrical energy, a housing for encasing the cell modules, and sensors for measuring a mechanical load on the cell modules. Also disclosed is a vehicle having the traction battery.

20 Claims, 10 Drawing Sheets

(56) References Cited

U.S. PATENT DOCUMENTS

| | | | | |
|---|---|---|---|---|
| 2010/0083733 A1* | 4/2010 | Russell | ............... | G01L 5/0052 73/12.01 |
| 2011/0014501 A1* | 1/2011 | Scheucher | ............... | B60K 1/04 429/7 |
| 2013/0323554 A1* | 12/2013 | Heubner | ............... | H01M 10/48 429/91 |
| 2015/0102666 A1* | 4/2015 | Izumi | ............... | B60L 3/12 307/10.1 |
| 2015/0132621 A1 | 5/2015 | Henrici et al. | | |
| 2016/0365611 A1* | 12/2016 | Yao | ............... | H01M 10/488 |
| 2017/0098871 A1* | 4/2017 | Fukuda | ............... | H01M 2/10 |
| 2018/0048032 A1 | 2/2018 | Takatsuka et al. | | |

FOREIGN PATENT DOCUMENTS

| | | |
|---|---|---|
| DE | 102012017184 A1 | 3/2014 |
| DE | 102014214810 A1 | 2/2016 |
| DE | 102014223359 A1 | 5/2016 |
| EP | 3249737 A1 | 11/2017 |
| JP | 2003274513 A | 9/2003 |
| JP | 2008258110 A | 10/2008 |
| JP | 201672011 A | 5/2016 |
| JP | 5928859 B1 | 6/2016 |
| JP | 2016118552 A | 6/2016 |
| WO | 2013022399 A1 | 2/2013 |
| WO | 2016143399 A1 | 9/2016 |

OTHER PUBLICATIONS

Korean Notice Of Preliminary Rejection for Korean Application No. 10-2017-0118312, dated Oct. 1, 2018, 3 pages.

Notification of Reason for Rejection for Japanese Application No. 2017-174561, dated Aug. 21, 2018, 4 pages.

German Search Report with partial English translation for German Application No. 10 2016 177 441.6, dated Jul. 7, 2017, 9 pages.

Notification of Reason for Rejection for Japanese Application No. 2017-174561, dated May 7, 2019, 5 pages.

Chinese Office Action for Chinese Application No. 201710828547. 4, dated Aug. 29, 2019, 6 pages.

Notification of Reason for Rejection for Japanese Application No. 2017-174561, dated Jan. 7, 2020, 6 pages.

* cited by examiner

SYSTEM FOR DETECTING MECHANICAL LOADING OF A TRACTION BATTERY FOR A VEHICLE

CROSS-REFERENCE TO RELATED APPLICATIONS

This application claims priority to German Patent Application No. 10 2016 117 441.6, filed Sep. 16, 2016, the content of such application being incorporated by reference herein in its entirety.

FIELD OF THE INVENTION

The present invention relates to a traction battery. The present invention also relates to a corresponding vehicle.

BACKGROUND OF THE INVENTION

A wide variety of traction batteries such as are used for driving electrical vehicles are adequately known. A traction battery of the same generic type is composed of a plurality of battery modules which are arranged in a common battery housing, usually in the underfloor of the vehicle. For safety reasons, it is necessary to monitor the battery or the battery modules for damage resulting from external loading such as impact accidents.

DE 10 2012 207 999 A1, which is incorporated by reference herein, relates to a wrapping film for a galvanic element. The wrapping film has at least one force sensor for detecting a state of extension of the wrapping film.

DE 10 2012 017 184 A1, which is incorporated by reference herein, discloses an electrochemical energy storage cell which contains an electrode assembly, which has at least a first electrode with a first polarity and at least a second electrode with a second polarity, and a film-like enclosure which at least partially surrounds the electrode assembly. In order to increase the safety, the enclosure has at least a first functional layer, which is of at least partially electrically conductive design and is connected in an electrically conductive fashion to the at least one first electrode of the electrode assembly, and at least one electrical insulating layer which, in the normal operating state of the energy storage cell, separates the first functional layer of the enclosure from the electrode assembly in a layer direction of the enclosure.

DE 10 2014 223 359 A1, which is incorporated by reference herein, finally relates to a device for checking the tightness of a battery cell with a detection device for detecting a first measured value of a parameter of the battery cell, wherein the parameter comprises a mass, a volume, a dimension or a thickness of the battery cell, and for detecting a second measured value of the parameter of the battery cell after a time period; a comparison device for comparing the second measured value with the first measured value; and a determining device for determining that the battery cell is not tight if the second measured value and the first measured value differ by more than a predetermined threshold value, or for determining that the battery cell is tight if the second measured value and the first measured value differ by less than the predetermined threshold value, a method, a computer program, a computer program product, a battery cell, a battery module, a battery, a battery system and a vehicle.

SUMMARY OF THE INVENTION

Described herein is a traction battery and a corresponding vehicle.

The approach according to aspects of the invention is based here on the realization that according to the prior art if the airbag system fires after an accident of a vehicle, the high-voltage system of said vehicle is switched off and the battery is scrapped independently of its state. A preceding evaluation of the state of the battery is considered here at most in terms of functional-electrical or thermal criteria but not optical-sensory criteria.

As a result, this routine causes all traction batteries to be unsatisfactorily exchanged after accidents involving triggering of the airbag or the seat belts. However, such exchanging, in particular, of contemporary lithium-ion batteries entails high costs for the vehicle holder or his insurance company. The invention recognizes that in this respect a suitable sensor system could supply more informative Indications of the need to exchange a battery; however, no corresponding solutions seem to be known in the prior art.

One embodiment of the invention therefore provides for a multiplicity of sensors to be integrated into the battery housing in order to measure the loading of the battery (modules). These sensors can be installed in a planar fashion in the battery housing, in particular in the underfloor and the sidewalls. The sensors can be arranged, for example, on a common film. The term "measurement" is to be interpreted here in a broad meaning which does not primarily refer to quantization—for example of a force of 2 kN or precise change in shape by means of strain gages—but rather to a qualitative detection of, for example, the topology of external contact forces via the outer faces of the battery housing.

An advantage of this solution lies in the knowledge which is gained of the loading of the battery cell modules at any time using suitable hardware and software. This in turn permits the recommissioning of batteries after their accident instead of unnecessary repair measures, exchanging measures or disposal measures, therefore providing a high potential for savings. In this way, a powerful development tool for the efficient configuration of batteries is provided at the same time.

Further advantageous refinements of the invention are specified in the dependent patent claims. It is therefore possible to provide for such a sensor system to be attached to the individual battery modules in order to detect loading of the individual battery modules.

BRIEF DESCRIPTION OF THE DRAWINGS

An exemplary embodiment of the invention is illustrated in the drawing and will be described in more detail below.

DETAILED DESCRIPTION OF THE INVENTION

Figure 1:
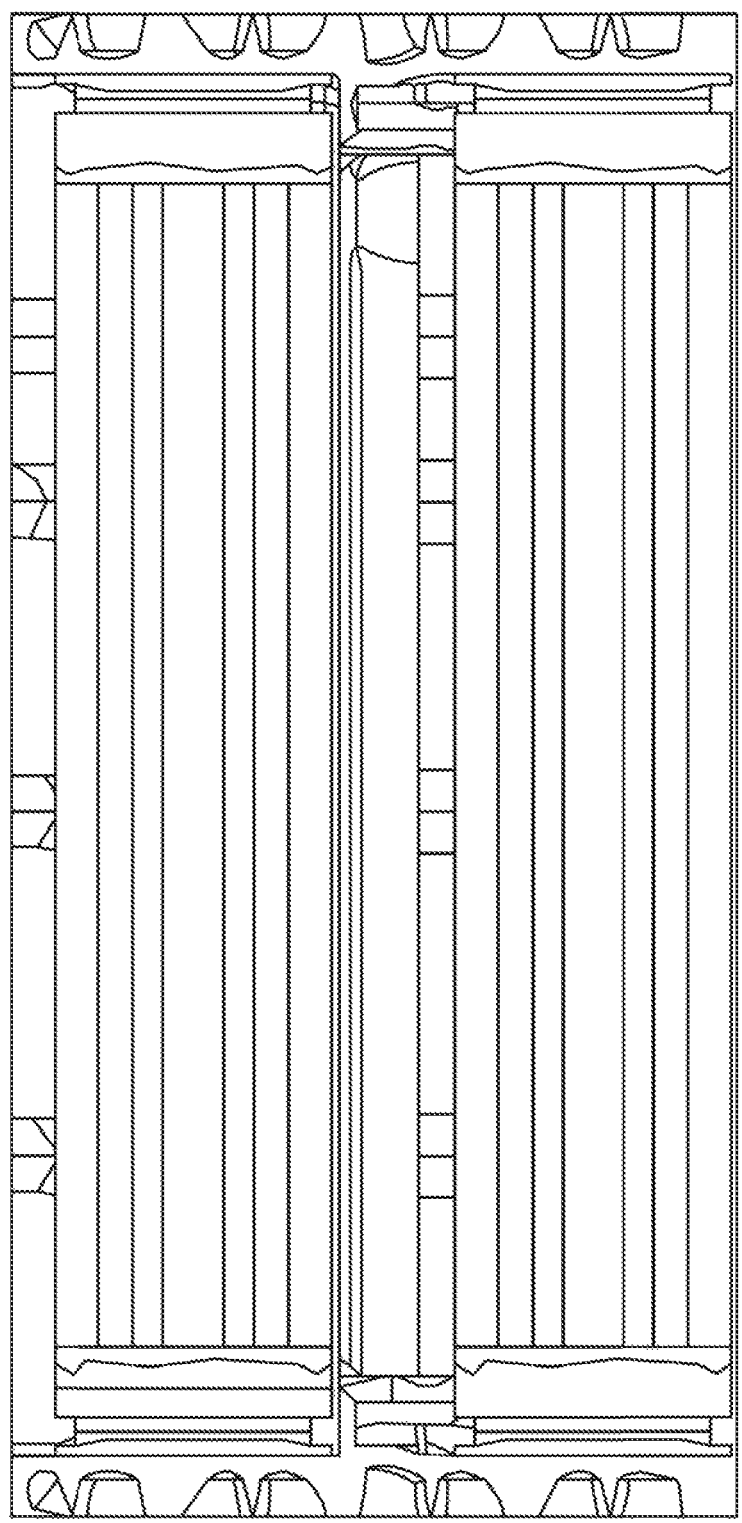
FIG. 1 shows the longitudinal section of a battery according to aspects of the invention.
Figure 2:
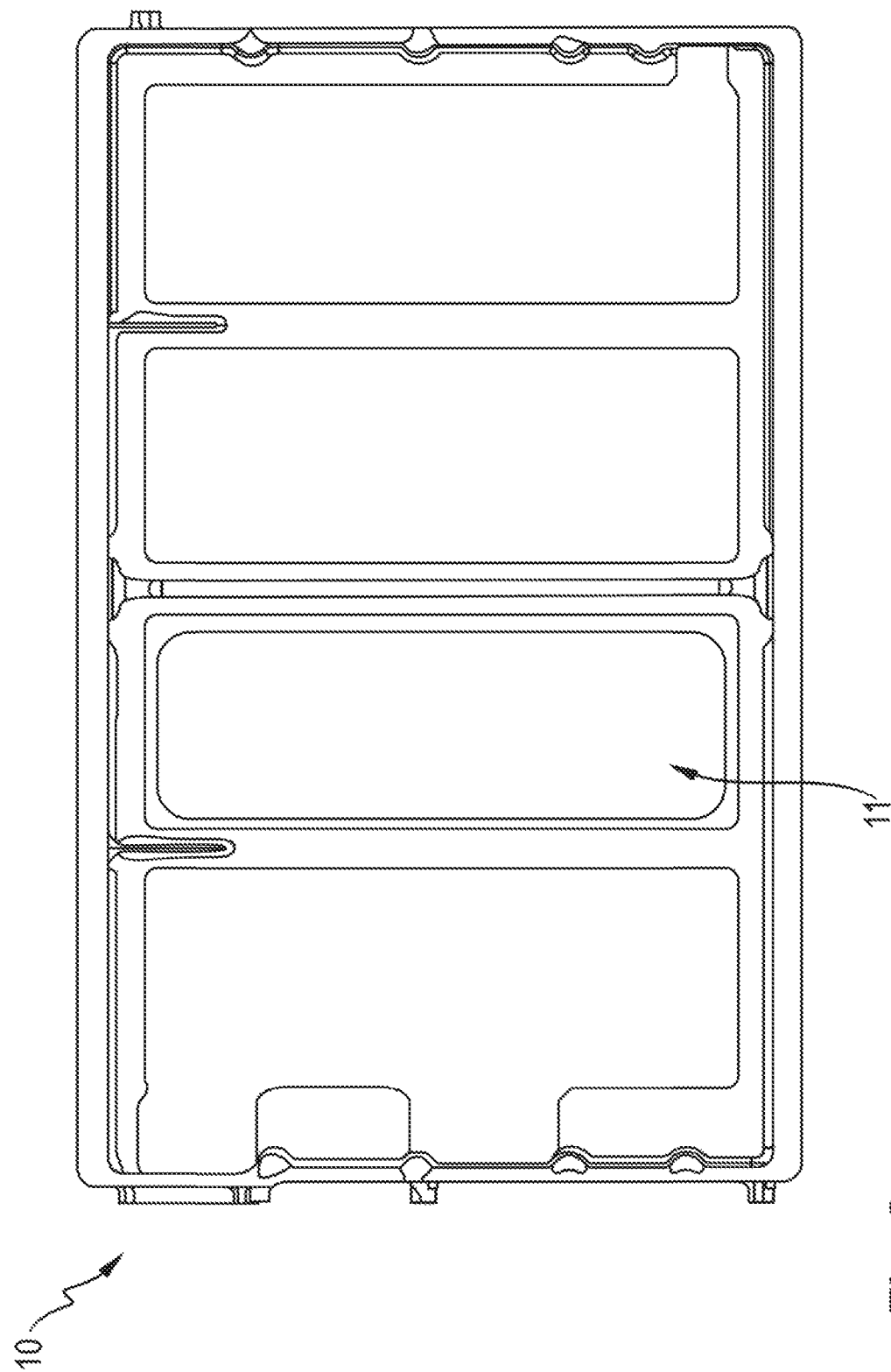
FIG. 2 shows a plan view of the opened battery housing which is equipped with a cell module.
Figure 3:
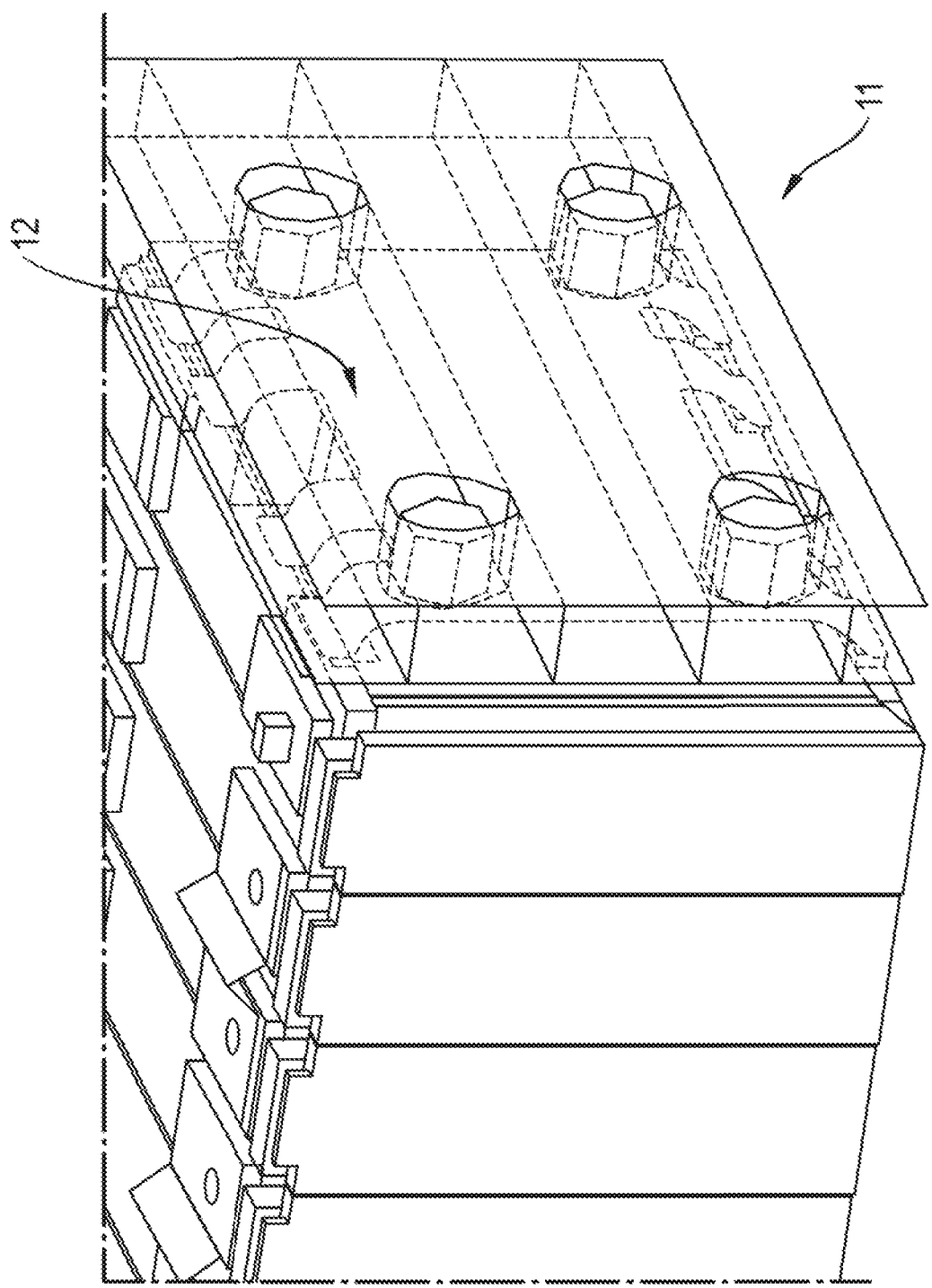
FIG. 3 shows a perspective view of the cell module which is provided with a sensor.
Figure 4:
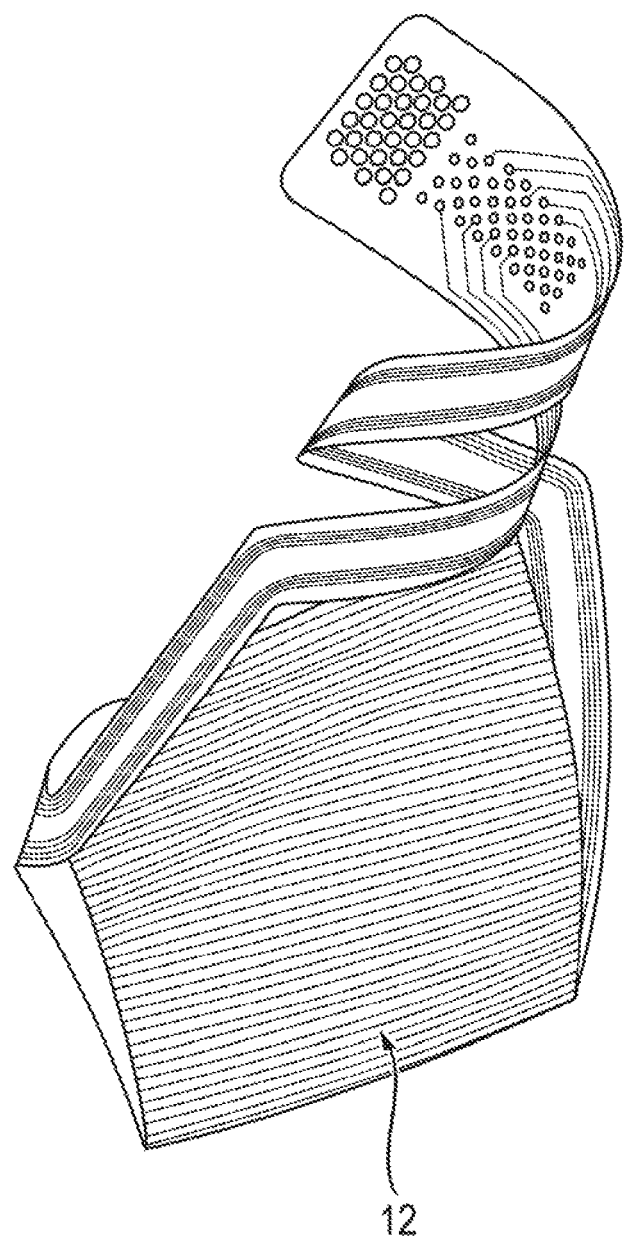
FIG. 4 shows a perspective view of the sensor in isolation.

FIGS. 1 and 2 illustrate in combination the basic design of a traction battery 10 according to aspects of the invention. The plan view according to FIG. 2 shows here an individual cell module 11 which, as illustrated in FIG. 3, is equipped with an integrated film sensor 12. This sensor 12 which is illuminated in FIG. 4 is composed of two very thin flexible polyester films on which conductor tracks which are arranged in parallel with one another are printed. The two films which are coated in an electrically semi-conductive fashion on the inside bear one against the other in such a way that their conductor tracks are in contact with one another at intersection points and therefore as it were define a matrix of individual measuring points. Each point of the matrix has here a variable resistance which is greatest in the unloaded state.

Figure 5:
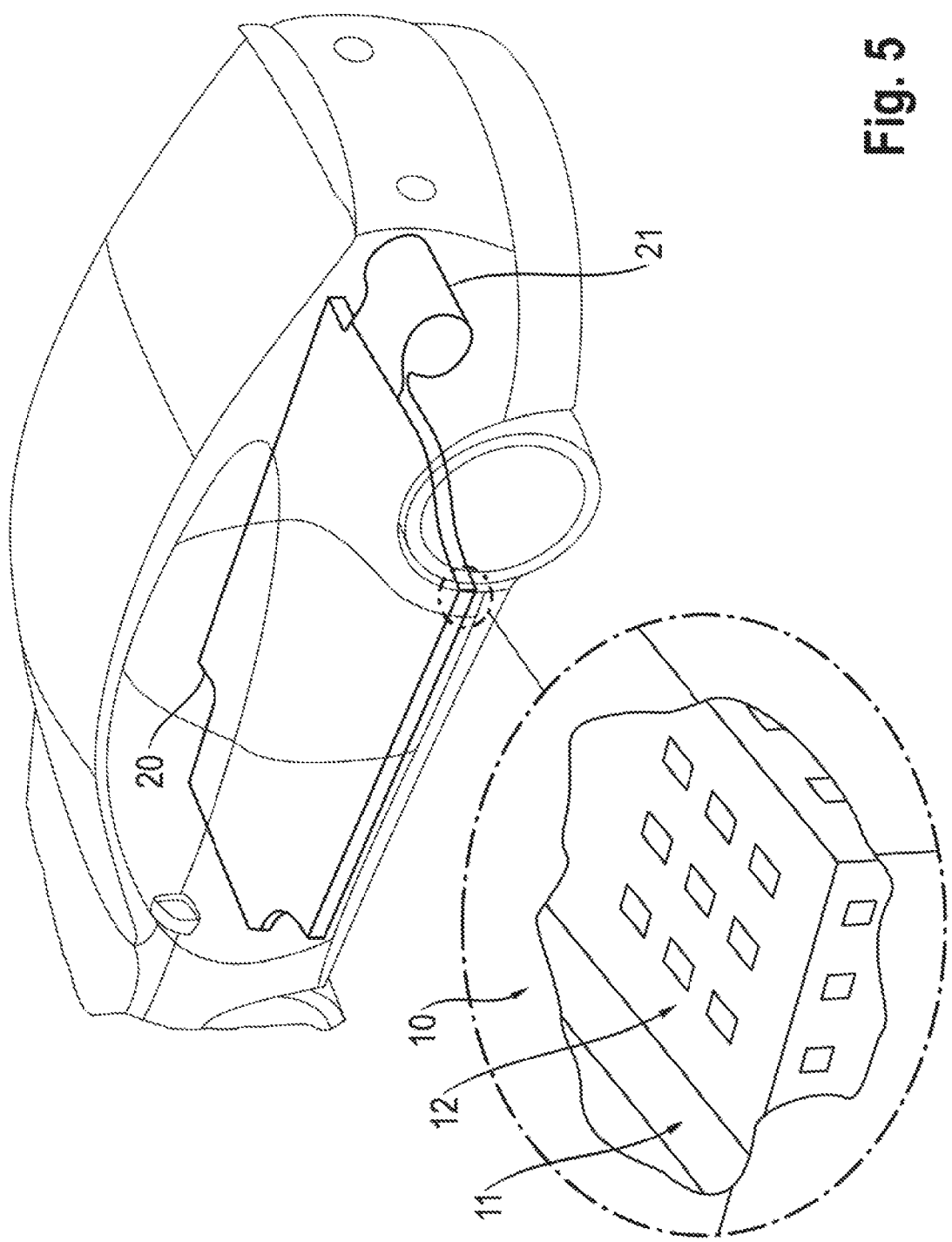
FIG. 5 shows the partially transparent perspective view of a vehicle according to aspects of the invention.

FIG. 5 shows this tactile film in the provided installation position of a traction battery 20 in the vehicle 30. The sensors 12 which are integrated into underfloor and sidewalls of the housing serve here to detect the mechanical loading or deformation of the bearing cell modules 11. For this purpose, an electronic multiplexer is configured in such a way that each intersection point is connected to an electrical voltage, and the resulting current strength at the respective intersection point therefore depends on the mechanical pressure acting on this point.

Figure 6:
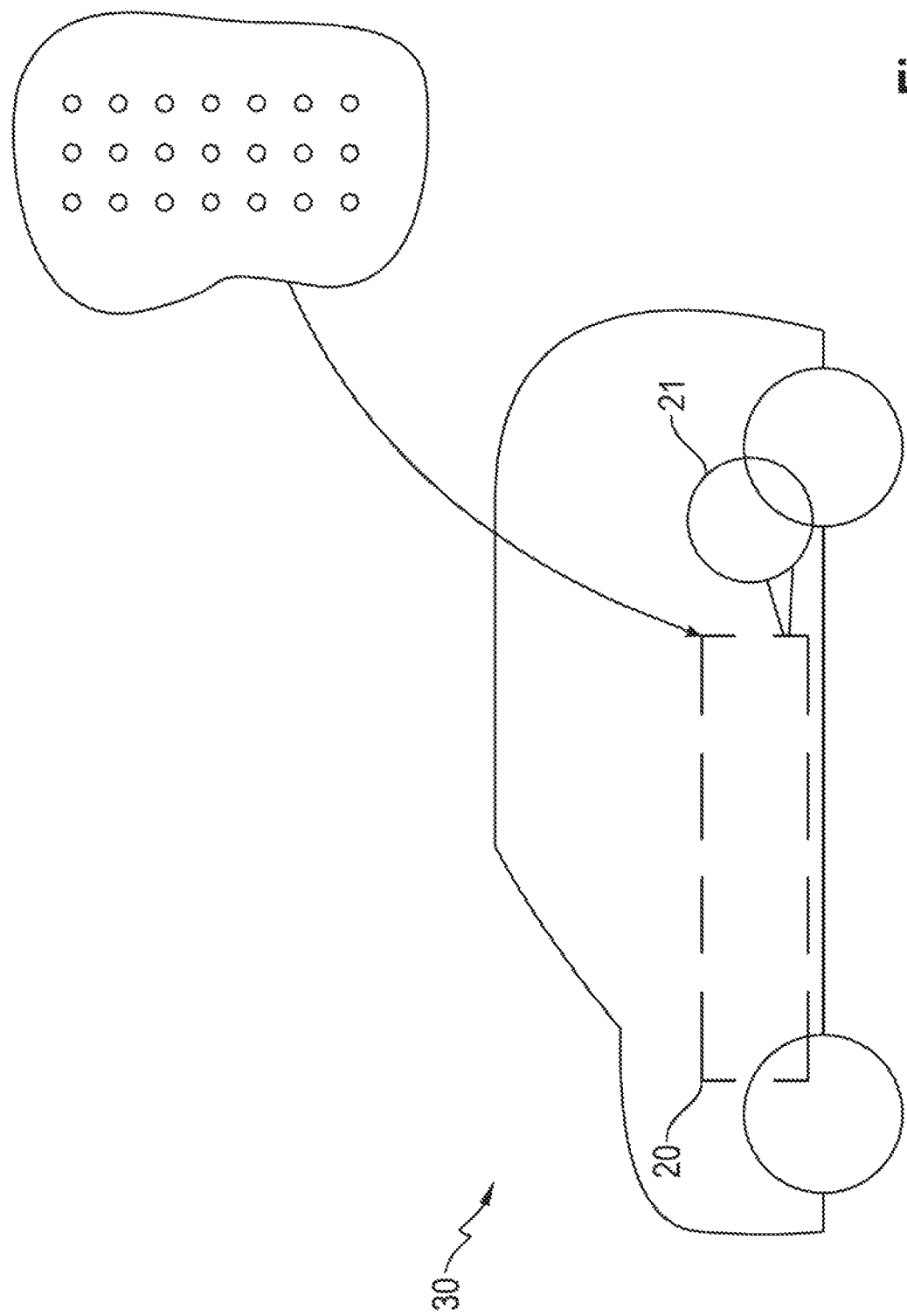
FIG. 6 shows a longitudinal section through the undamaged vehicle.
Figure 7:
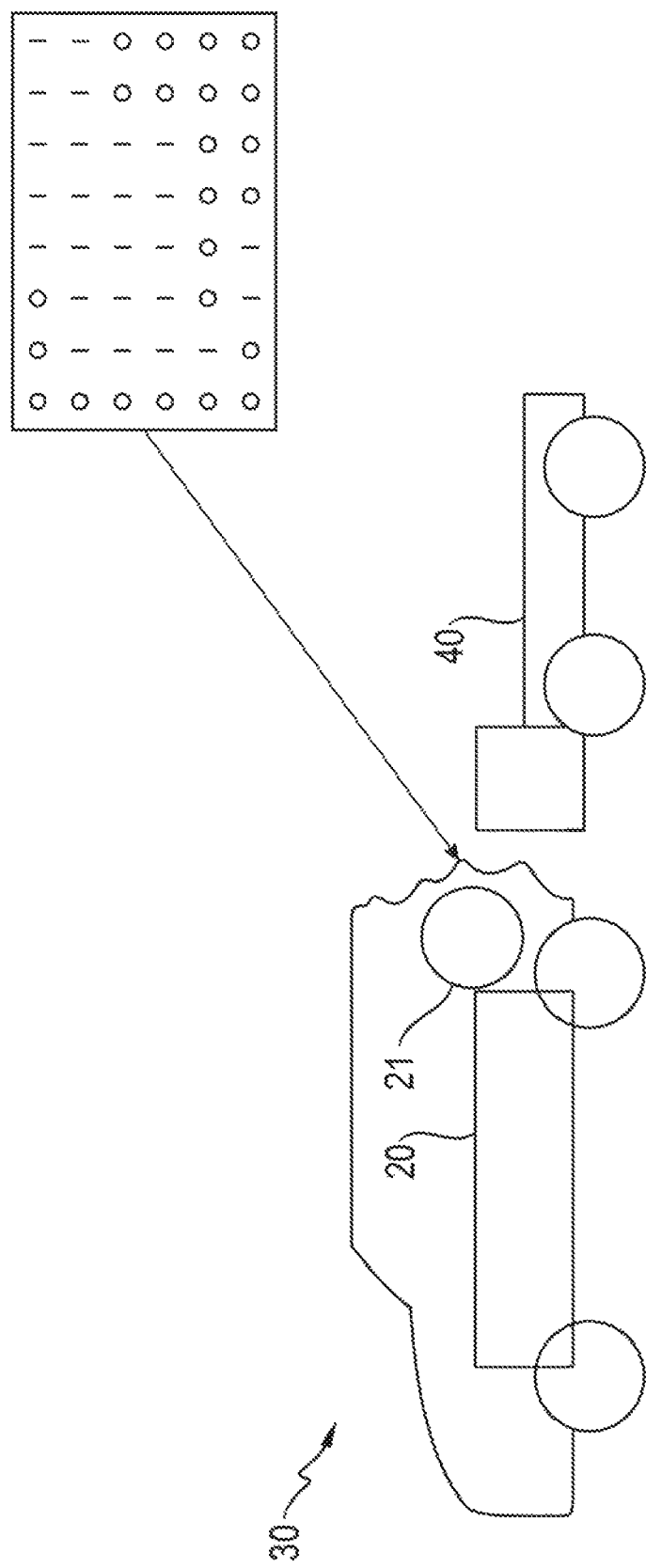
FIG. 7 shows the longitudinal section through the vehicle after an accident.

When the vehicle 30 is not damaged, an essentially uniform pressure distribution over the entire matrix of the film sensor 12 is therefore produced, as illustrated in FIG. 6. The situation is different after the crash test shown in FIG. 7: as a result of the impact of the mobile crash barrier 40 against the rear of the vehicle 30, said crash barrier 40 has in this case shifted the electric motor 21 of the vehicle 30 in such a way that the traction battery 20 is subject to considerable mechanical loading. This is in turn reflected in a non-uniform pressure distribution which differs significantly from the normal state and which can be used as a basis for a state evaluation of the traction battery 20. For this purpose, the vehicle 30 can comprise a logic circuit not illustrated in the drawings which permits intelligent monitoring of the sensor data in conjunction with further influencing variables supplied, for example, by the airbag.

Figure 8:
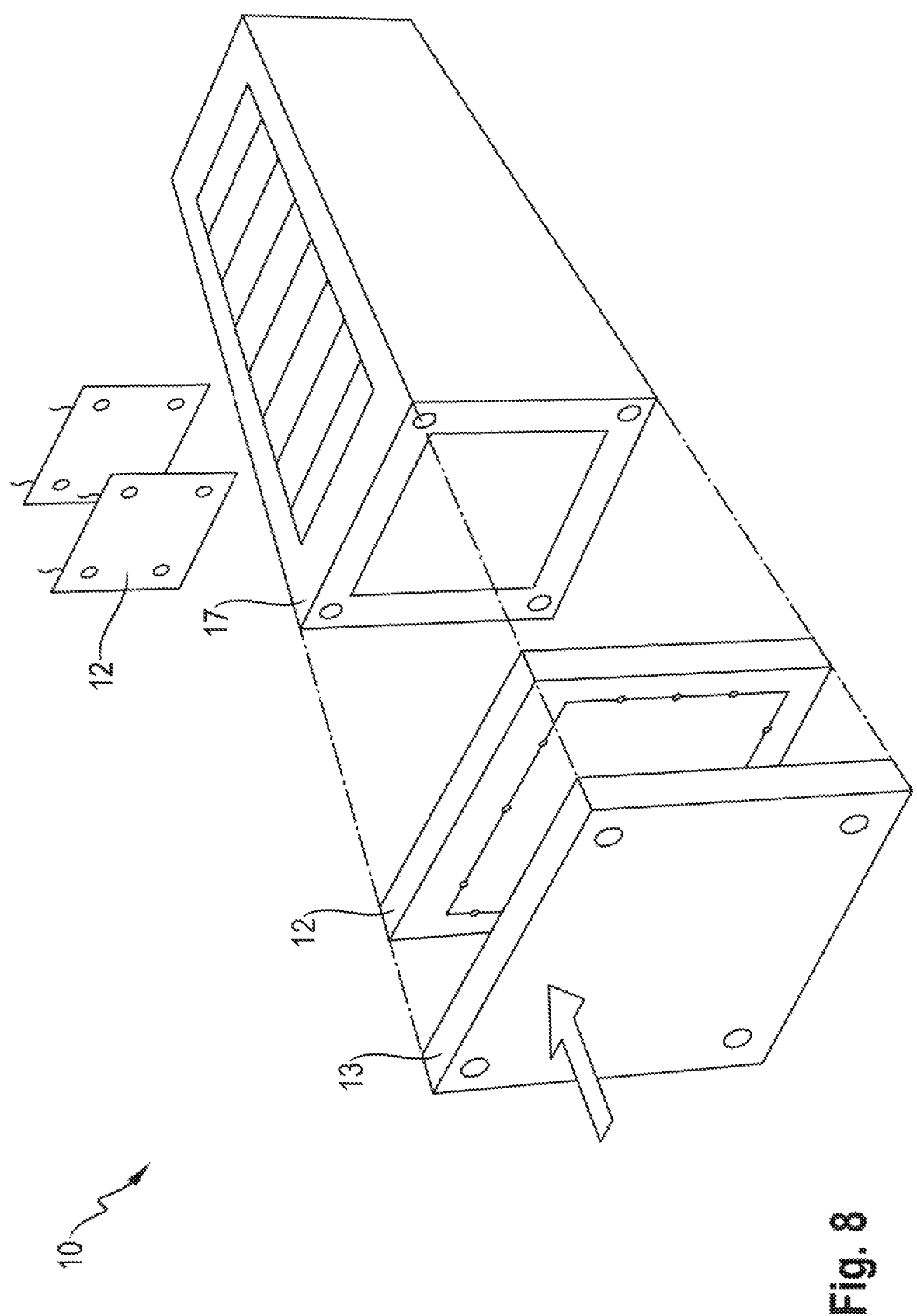
FIG. 8 shows the exploded illustration of a first variant of the invention.
Figure 9:
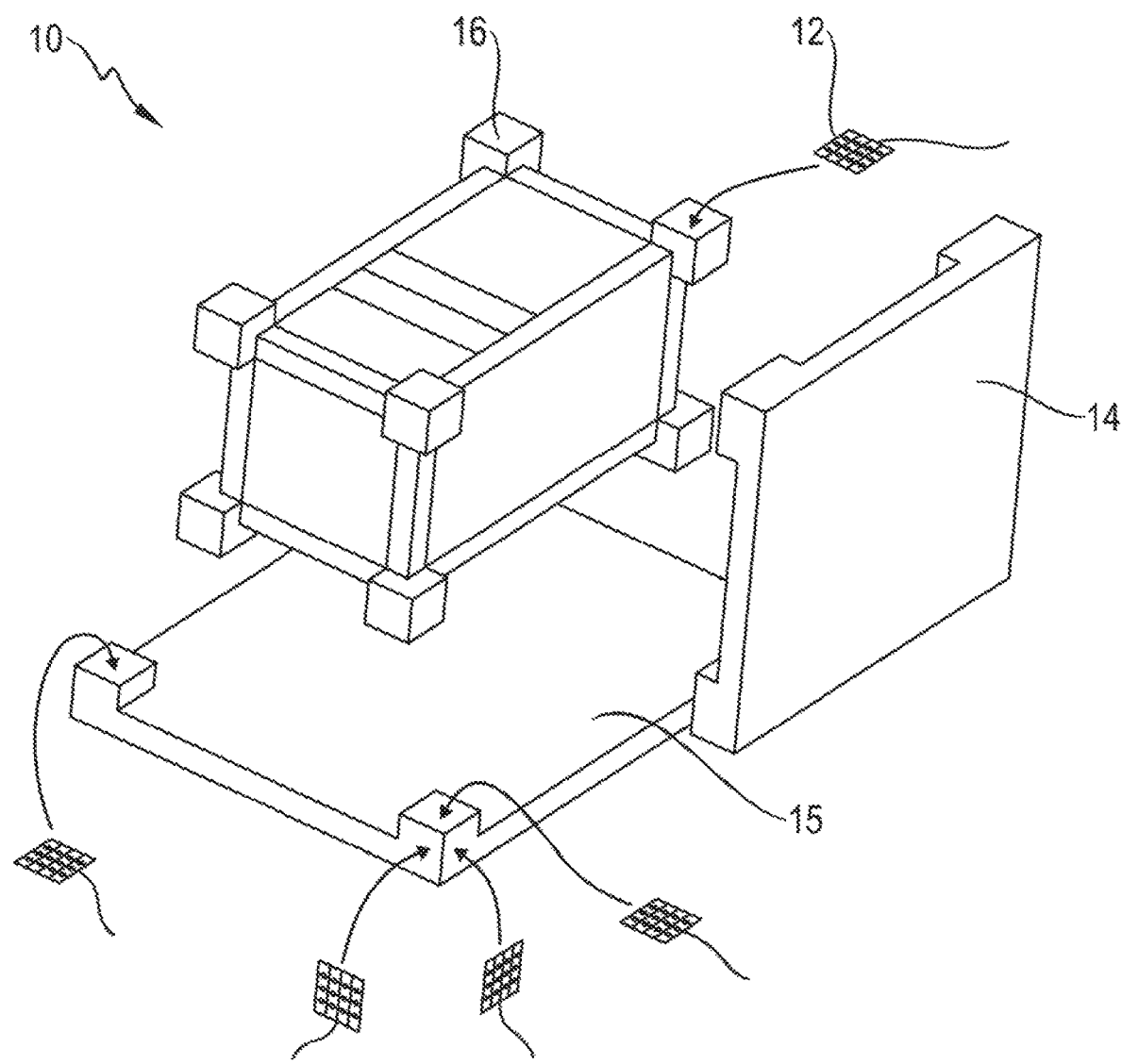
FIG. 9 shows the exploded illustration of a second variant of the invention.
Figure 10:
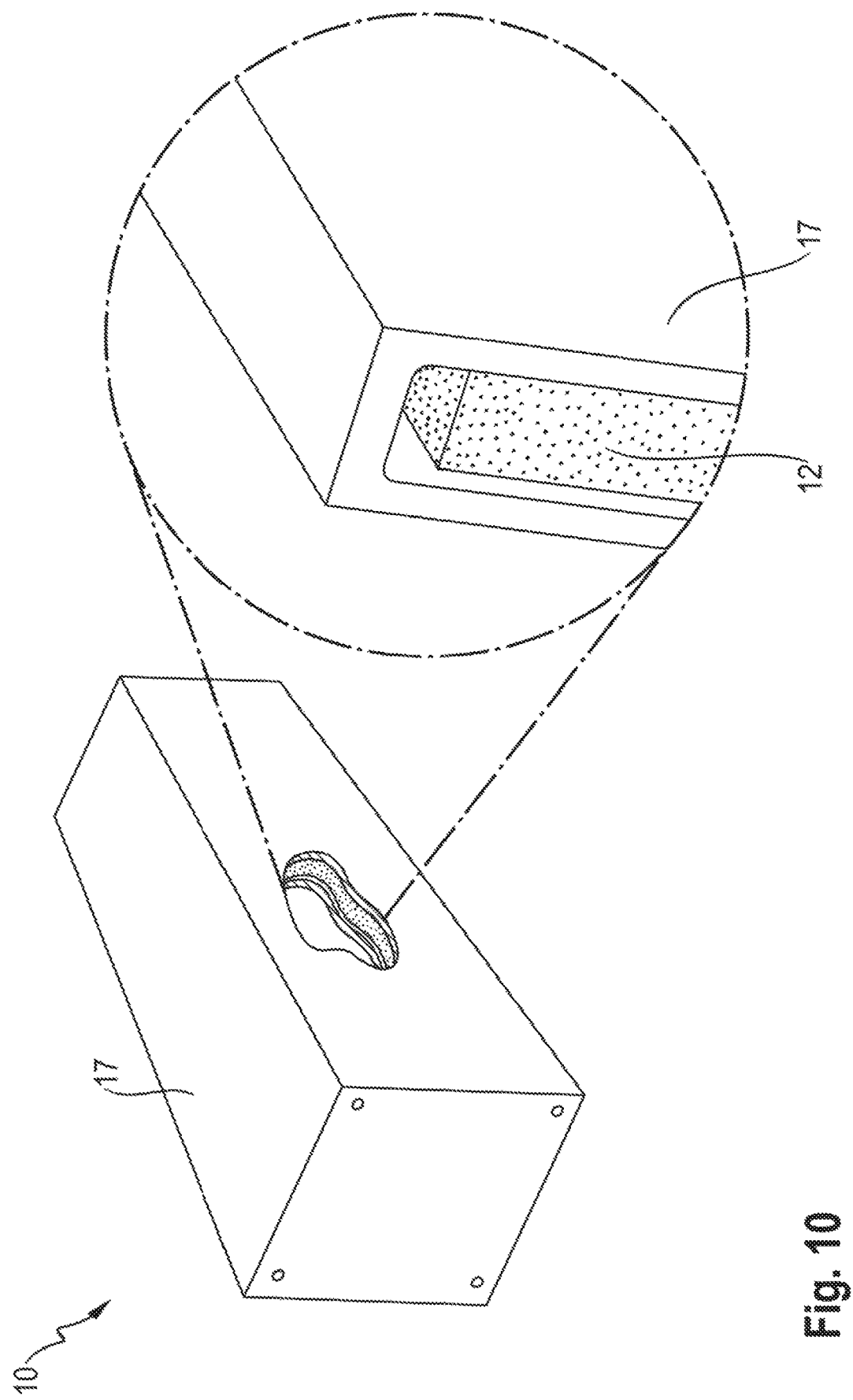
FIG. 10 shows the partial section through a third variant of the invention.

It is apparent here that the sensors may be separated locally from the cell modules 11 in a wide variety of ways, for example in front panels 13, walls 14, bases 15 or at suitable corner points 16 of the battery housing 17 without departing from the scope of the invention. This is clarified by way of example by FIGS. 8, 9 and 10, with a wide selection of variants of the illustrated configurations seeming to be conceivable.

What is claimed is:

1. A traction battery of a vehicle comprising: cell modules for storing electrical energy that are stacked together in a side by side fashion, a housing for encasing the cell modules, sensors configured to detect either a mechanical force applied to the cell modules or deformation of the cell modules, wherein at least one of the sensors is arranged between the cell modules, and a removable panel mounted to and covering a portion of the housing, and wherein at least another one of the sensors is positioned between the removable panel and the housing, wherein the sensors are positioned entirely outside of the cell modules, wherein the sensors are connected to a logic circuit, and the logic circuit is configured to determine the occurrence of a vehicle accident and then determine a condition of the traction battery following the accident based upon an output from the sensors.

2. The traction battery as claimed in claim 1, wherein the sensors are configured for detecting the mechanical load on the basis of deformation of the cell modules.

3. The traction battery as claimed in claim 1, further comprising additional sensors integrated into the housing.

4. A vehicle comprising an electric motor for driving the vehicle and the traction battery of claim 1, which is electrically connected to the electric motor.

5. The traction battery as claimed in claim 1, wherein the sensor is sandwiched between two adjacent cell modules.

6. The traction battery as claimed in claim 1, further comprising an additional sensor integrated into one of the cell modules.

7. The traction battery as claimed in claim 1, further comprising a logic circuit that is configured to evaluate a state of the traction battery by monitoring data transmitted by the sensors in conjunction with influencing variables supplied by an airbag of the vehicle.

8. The traction battery as claimed in claim 1, wherein the sensors are connected to a logic circuit, and the logic circuit is configured to determine the occurrence of a vehicle accident and then determine a condition of the traction battery following the accident based upon an output from the sensors.

9. The traction battery as claimed in claim 1, wherein the sensors are film sensors, and each film sensor comprises two films, and wherein the films each have conductor tracks on only one side.

10. The traction battery as claimed in claim 9, wherein the conductor tracks for each of the films are arranged parallel to one another, and wherein the films are directly arranged one against the other in such a way that the conductor tracks touch one another at intersection points.

11. The traction battery as claimed in claim 10, wherein the films are coated in an electrically semi-conductive fashion on an inside at least at the intersection points.

12. The traction battery as claimed in claim 11, wherein the film sensors also comprise an electronic multiplexer, and wherein the multiplexer is configured in such a way that each of the intersection points is connected to an electrical voltage, with the result that a current strength, brought about by the voltage, at the respective intersection point depends on a mechanical pressure acting on the intersection point.

13. The traction battery as claimed in claim 9, wherein each film is a polyester film.

14. The traction battery as claimed in claim 1, wherein the sensors are integrated into an underfloor and sidewalls of the housing, and all of the sensors are arranged on a single common film sensor.

15. The traction battery as claimed in claim 1, further comprising a logic circuit that is configured to evaluate a state of the traction battery by monitoring data transmitted by the sensors in conjunction with influencing variables supplied by the vehicle.

16. The traction battery as claimed in claim 1, wherein one the sensors includes openings to accommodate fasteners for mounting to one of the cell modules.

17. The traction battery as claimed in claim 1, wherein at least one of the walls of the housing is hollow, and at least one of the sensors is positioned in the hollow wall of the housing.

18. The traction battery as claimed in claim 1, wherein the housing is positioned on a base, and at least one of the sensors is mounted to the base.

19. The traction battery as claimed in claim 1, wherein the housing is positioned on a base, and at least one of the sensors is mounted to a corner of the base.

20. The traction battery as claimed in claim 1, wherein the housing is at least partially enclosed within a structure comprising a base and side walls, and one of more of the sensors are mounted to the base and the side walls.

* * * * *